United States Patent
Pradhan et al.

(10) Patent No.: US 7,218,917 B2
(45) Date of Patent: May 15, 2007

(54) METHOD FOR SEARCHING NODES FOR INFORMATION

(75) Inventors: Salil Vjaykumar Pradhan, Santa Clara, CA (US); John Grundback, Palo Alto, CA (US); Geoff Lyon, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 769 days.

(21) Appl. No.: 10/051,857

(22) Filed: Jan. 15, 2002

(65) Prior Publication Data

US 2003/0134618 A1   Jul. 17, 2003

(51) Int. Cl.
*H04L 12/58* (2006.01)

(52) U.S. Cl. ............... 455/412.1; 340/505; 705/1; 379/88.27

(58) Field of Classification Search ........... 709/227, 709/226, 219, 223, 218; 455/414.1, 414.2, 455/414.3, 412.1, 426.1; 379/88.22, 88.27; 705/1; 340/505, 10.1
See application file for complete search history.

(56) References Cited

U.S. PATENT DOCUMENTS

| | | |
|---|---|---|
| 5,481,532 A | 1/1996 | Hassan et al. |
| 6,301,617 B1 * | 10/2001 | Carr ............... 709/227 |
| 2003/0014269 A1 * | 1/2003 | Malkin et al. ......... 705/1 |
| 2003/0018774 A1 * | 1/2003 | Flinck et al. ......... 709/223 |

FOREIGN PATENT DOCUMENTS

| | | |
|---|---|---|
| EP | 0993163 | 4/2000 |
| WO | WO98/39936 | 9/1998 |
| WO | WO01/15374 | 3/2001 |

\* cited by examiner

*Primary Examiner*—Gerald Gauthier

(57) ABSTRACT

A method by which one node can search for and retrieve information from another node. A message identifying the sought-for information item and an address is created at a first node. The address identifies a repository for the sought-for information. A second node receives the contents of this message and responds with the information item if the item is available. Otherwise, the second node propagates the message to other nodes. The message is propagated from node to node until it reaches a node having the sought-for information item. If this node can connect to the specified address, it sends the information item to the repository. Otherwise, the node adds the information item to the message, which is propagated to other nodes until the message reaches a node that can connect with the address. The information item can then be retrieved from the repository.

20 Claims, 4 Drawing Sheets

500

510
RECEIVE AN ADDRESS AND CONTENT PERTAINING TO SOUGHT-FOR ITEM OF INFORMATION

520
SEND INFORMATION TO ADDRESS IF INFORMATION AND CONNECTION ARE AVAILABLE

525
OTHERWISE, PROPAGATE A MESSAGE INCLUDING THE ADDRESS AND CONTENT PERTAINING TO THE SOUGHT-FOR ITEM OF INFORMATION

METHOD FOR SEARCHING NODES FOR INFORMATION

TECHNICAL FIELD

The present invention relates to networks of wireless devices. More specifically, the present invention pertains to a method of actively searching for information stored in such a network.

BACKGROUND ART

An ad hoc network generally includes a number of mobile devices (or nodes) that typically communicate with each other using some type of wireless signal. The types of wireless signals in use can include, but are not limited to, infrared signals and radio frequency (RF) signals including short wave, Bluetooth, and IEEE 802.11.

By virtue of their mobility, the nodes in an ad hoc network are continually moving into and out of communication range with other nodes. Thus, the topology of such a network is dynamic and temporal, as two nodes in communication range at one point in time may not be in communication range at a later time.

Because of their dynamic nature, searching for and retrieving information residing in the ad hoc network can be problematic. This problem is illustrated by Prior Art FIG. 1.

Prior Art FIG. 1 illustrates an ad hoc network that consists of nodes 2, 3, 6, 7 and 8. As illustrated, nodes 7 and 8 can communicate directly, as can nodes 6 and 7, nodes 3 and 7, nodes 2 and 6, and nodes 2 and 3. In addition, node 8, for example, can communicate indirectly to node 3, for example, via node 7. The other nodes (1, 4, 5, 9, 10 and 11) are not within communication range of any of the nodes 2, 3 6, 7 or 8.

A problem occurs when, for example, node 8 seeks to retrieve information from one of the nodes 2, 3, 6 or 7. Any one of these nodes may move out of communication range at any time, meaning that node 8 would no longer be able to retrieve information from them. Nodes that are more than one "hop" away from node 8 (e.g., nodes 2, 3 or 6) may move in and out of range without node 8 being aware. Thus, a message from node 8 intended for node 2, for example, may or may not reach node 2. If the message from node 8 does indeed reach node 2, then node 2 or node 8 (or one of the intervening nodes 3, 6 or 7) may in the meantime move out of communication range, severing the communication link between nodes 2 and 8 before node 2 can respond. In addition, a unique identifier may not be associated with each node, and so generally it is not possible to send a message (or a response) to a particular node (e.g., node 8), nor to send a response to a query back along the same path that the query traveled.

A similar problem occurs when, for example, node 8 is seeking information that resides only on node 1. In the example of Prior Art FIG. 1, nodes 1 and 8 are not in communication range. Also, none of the nodes in the ad hoc network (e.g., nodes 2, 3, 6 and 7) are able to communicate with node 1, so that a communication path from node 8 to node 1 is not established. However, it is possible that, at some future point in time, a communication path between nodes 1 and 8 may be established, perhaps via one or more hops over intervening nodes. Even so, should node 8 get a message to node 1, it still might not be possible for node 1 to respond to node 8, as explained above. In fact, when separated from node 8 by several hops, node 1 will likely not know that node 8 is the node seeking information, and therefore node 1 will not know where to direct a response.

Therefore, in general, searching for and retrieving information that resides in an ad hoc network is difficult because communication paths between nodes are continually changing. A communication path that was present when a search for an item of information was initiated may not be present by the time the item of information is located. Also, a node that has the sought-for item of information may not know where to send the information. Accordingly, what is needed is a method that can facilitate the search for and retrieval of information residing in an ad hoc network. What is also needed is a method that can satisfy this need without hindering the mobility of the nodes that form the ad hoc network. The present invention provides a novel solution to these needs.

DISCLOSURE OF THE INVENTION

Embodiments of the present invention provide a method that allows information residing in wireless devices to be searched for and retrieved. Embodiments of the present invention also provide a method that accomplishes this within the framework of an ad hoc network of devices.

Embodiments of the present invention pertain to a method of directed information harvesting in an ad hoc network. In the present embodiment, a message identifying the sought-for information item and an address for an information repository is created at a first node. In general, the information repository is a central site that is readily accessible. A second node receives the contents of this message and responds with the information item if the item is available. Otherwise, the second node propagates the message to other nodes. The message is propagated from node to node until it reaches a node having the sought-for information item. If this node can make a connection to the information repository, it sends the information item to the address specified in the message. Otherwise, the node adds the information item to the message, which is propagated to other nodes until the message reaches a node with the capability to connect with the information repository. This node sends the information to the address specified in the message. The originator of the message can then retrieve the information item by accessing the repository using any device with the capability to connect with the repository.

In one embodiment, the information repository is a Web site and the address is a Web-based address such as a Uniform Resource Locator. In this embodiment, nodes with Internet access can send the sought-for information to the Web site, and the originator of the message can retrieve the information by accessing the Web site using any device with Internet access.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing terms such as "receiving," "creating," "reading," "sending," "propagating," or the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present invention is also well suited to the use of other computer systems such as, for example, optical and mechanical computers.

Figure 1:
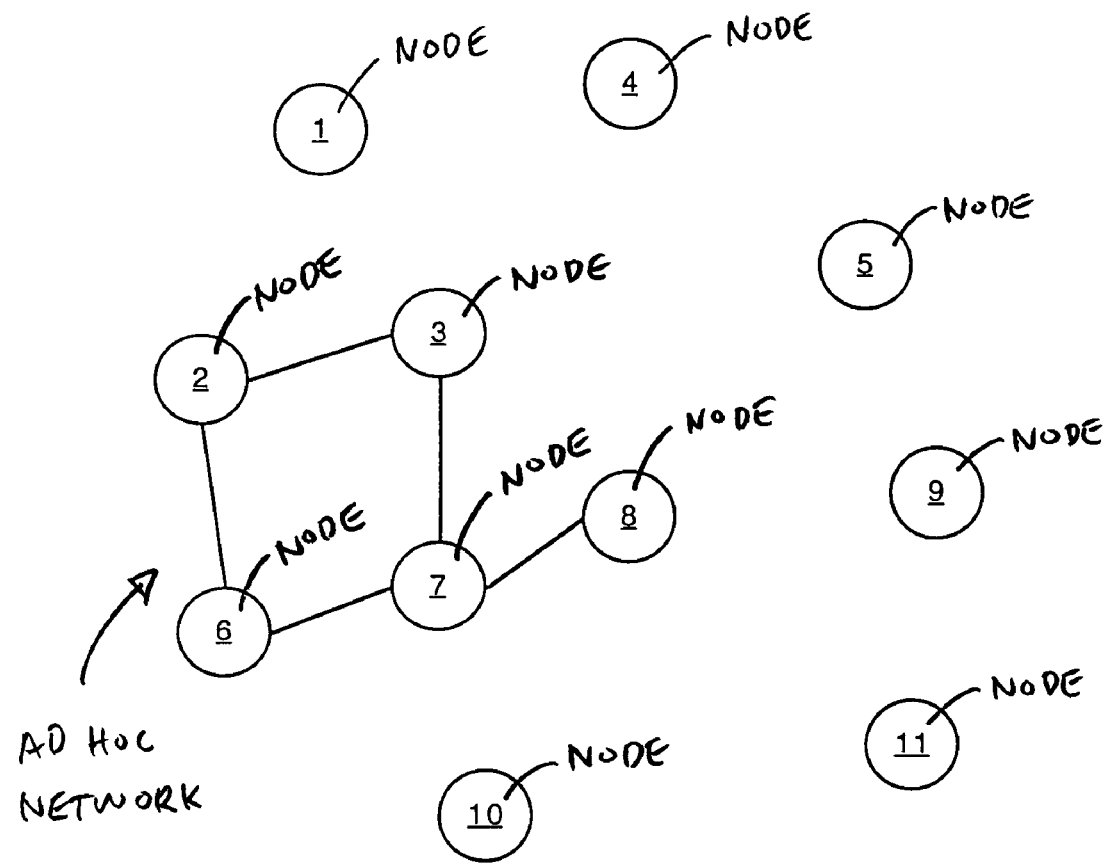
FIG. 1 illustrates nodes in an ad hoc network.
Figure 2:
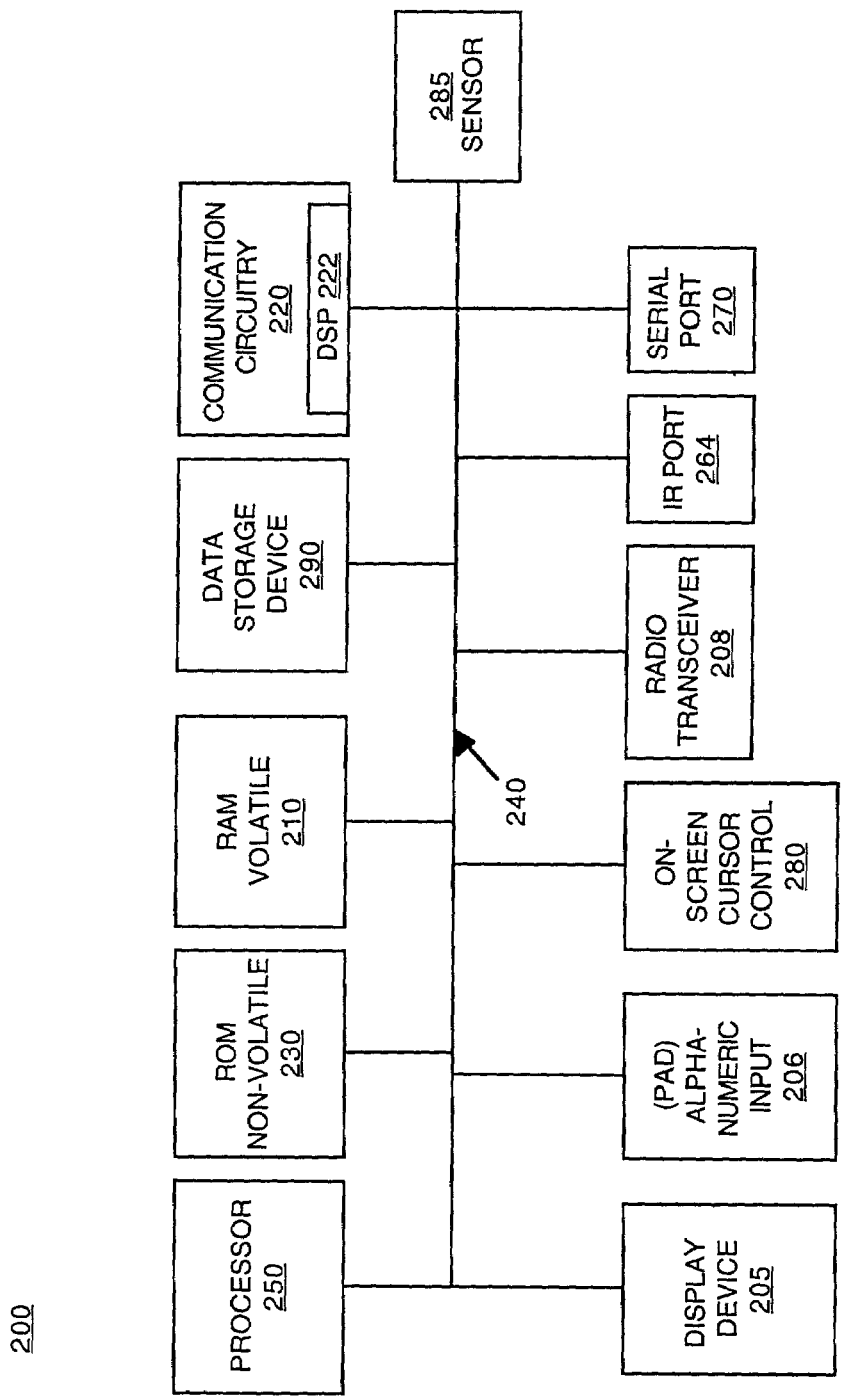
FIG. 2 is a block diagram of an exemplary wireless device (node) upon which embodiments of the present invention may be practiced.

FIG. 2 is a block diagram of one embodiment of a wireless device 200 upon which embodiments of the present invention may be implemented. Wireless device 200 can be a PDA (personal digital assistant), a PID (personal information device), a palmtop, a hand-held computer system, or the like. Wireless device 200 may also be a mobile telephone (cell phone) or similar device. Wireless device 200 may be mobile, although embodiments of the present invention may be practiced with devices that are not mobile or that are stationary.

Wireless device 200 includes an address/data bus 240 for communicating information, a central (main) processor 250 coupled with the bus 240 for processing information and instructions, a volatile memory 210 (e.g., random access memory, RAM) coupled with the bus 240 for storing information and instructions for the main processor 250, and a non-volatile memory 230 (e.g., read only memory, ROM) coupled with the bus 240 for storing static information and instructions for the main processor 250. Wireless device 200 also includes an optional data storage device 290 (e.g., a Secure Digital card or a Multi Media Card) coupled with the bus 240 for storing information and instructions. Device 290 can be removable. Wireless device 200 also contains a display device 205 coupled to the bus 240 for displaying information to the user.

In the present embodiment, wireless device 200 includes communication circuitry 220 coupled to bus 240. In one embodiment, communication circuitry 220 is a universal asynchronous receiver-transmitter (UART) module that provides the receiving and transmitting circuits required for serial communication for both the serial port 270 and the infrared port 264. Infrared port 264 provides the capability for wireless communication using an infrared signal.

In one embodiment, wireless device 200 includes a radio transceiver 208 providing it with the capability for wireless communication using a wireless radio frequency (RF) communication link established between wireless device 200 and other devices, using any of the various RF protocols and standards. In this embodiment, communication circuitry 220 also includes digital signal processor (DSP) 222 for processing data to be transmitted or data that are received via radio transceiver 208. It is appreciated that radio transceiver 208 may be integrated into wireless device 200, or that radio transceiver 208 may be a separate component coupled to wireless device 200 using, for example, serial port 270.

Also included in wireless device 200 is an optional alphanumeric input device 106 that, in one implementation, is a handwriting recognition pad ("digitizer"). Alphanumeric input device 206 can communicate information and command selections to main processor 250 via bus 240. In one implementation, alphanumeric input device 206 is a touch screen device. Alphanumeric input device 206 is capable of registering a position where a stylus element (not shown) makes contact.

Wireless device 200 also includes an optional cursor control or directing device (on-screen cursor control 280) coupled to bus 240 for communicating user input information and command selections to main processor 250. In one implementation, on-screen cursor control device 280 is a touch screen device incorporated with display device 205. On-screen cursor control device 280 is capable of registering a position on display device 205 where a stylus element makes contact. The display device 205 utilized with wireless device 200 may be a liquid crystal display (LCD) device, a cathode ray tube (CRT), a field emission display device (also called a flat panel CRT), or other display device suitable for generating graphic images and alphanumeric characters recognizable to the user.

In one embodiment, wireless device 200 is used as a sensor device incorporating an optional sensor 285 coupled to bus 240. In this embodiment, sensor 285 is for sensing (measuring) a condition external to the device (temperature, for example). However, in the context of this embodiment of the present invention, the definition of wireless device 200 as a sensor device is expanded to include input from a user as sensor input. Such input from a user may take the form of a text-based message that can be parsed or otherwise incorporated into a message, using Extensible Markup Language (XML), for example. User input may also take the form of a response to specific questions, akin to a poll or survey in which the user provides inputs by making a choice from a number of offered selections. In addition, the user input may be information or data that resides in a memory that is searchable using well-known search techniques or search engines. Although these forms of user input are offered as examples, it is understood that other types of input can be used according to the various embodiments of the present invention.

Figure 3A:
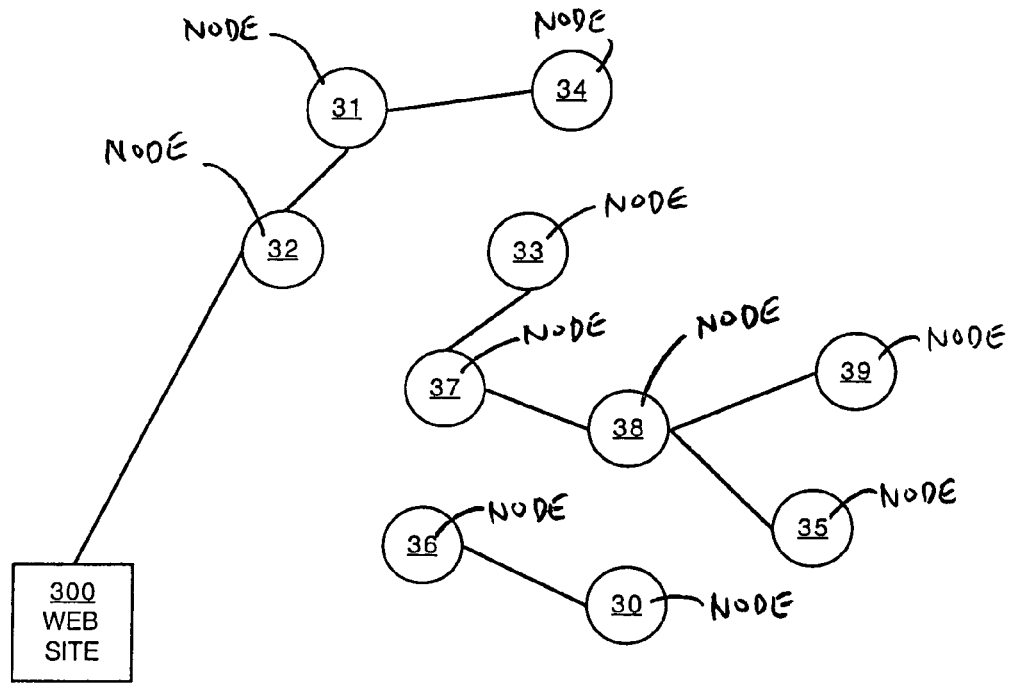
FIGS. 3A and 3B illustrate nodes in an ad hoc network according to one embodiment of the present invention.
Figure 3B:
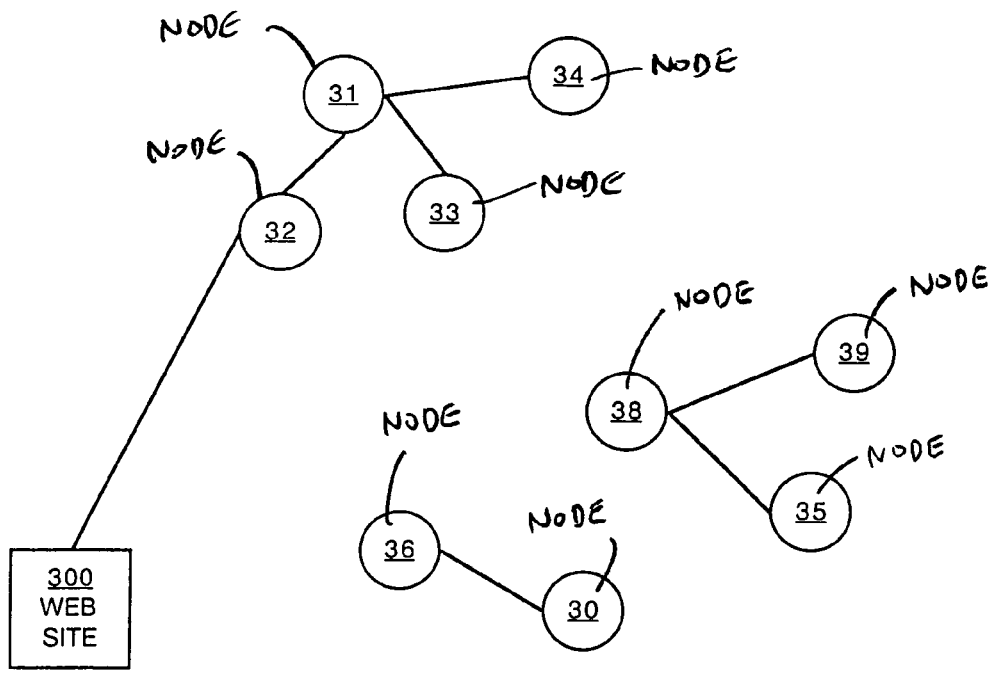

FIGS. 3A and 3B illustrate nodes in an ad hoc network according to one embodiment of the present invention. Nodes 31–39 are exemplified by wireless device 200 of FIG. 2, although it is understood that other types of devices may be used.

In one embodiment, the present invention is described by way of example using the illustrations of FIGS. 3A and 3B. Referring first to FIG. 3A, node 38 seeks information that resides only on node 31, but node 38 does not know whether node 31 (or any of the other nodes) has the sought-for information. According to the present embodiment of the present invention, node 38 creates a message that identifies the item of information that is being sought. In one embodiment, the message is a polling message, further explained below in conjunction with FIG. 5. Also in accordance with the present embodiment of the present invention, the message identifies an address for a central information repository. In one embodiment, the address is a Web-based address (e.g., a Uniform Resource Locator) for Web site 300. In another embodiment, the message may also include a unique message identifier (a unique message ID).

Continuing with reference to FIG. 3A, the message created by node 38 is readable by other nodes within communication range (e.g., nodes 33, 35, 37 and 39). In one embodiment, the message is read from node 38 by those nodes within range; that is, the nodes 33, 35, 37 and 39 access the message residing on node 38 and read the information in the message. In another embodiment, the message may be broadcast by node 38 to those nodes within range. In any case, nodes 33, 35, 37 and 39 are made aware of the information being sought by node 38.

If any of the nodes 33, 35, 37 or 39 have the sought-for information, they provide it to node 38 if they are still able to communicate with node 38. However, as described above, for the purposes of this example, only node 31 has the information sought by node 38.

Referring now to FIG. 3B, node 33 moves further away from node 38, and node 37 is removed from the network (perhaps node 37 has moved further away, has been shut off, etc.). According to the present embodiment of the present invention, node 33 will propagate the message originated by node 38 to node 31. In one embodiment, node 33 accomplishes this by forwarding (e.g., broadcasting) the message it received from node 38. In another embodiment, node 33 accomplishes this by reading the message from node 38 and creating a duplicate message that in turn is read by node 31. In any case, as in the above, node 31 is made aware of the information being sought by node 38.

In this example, node 31 has the information sought by node 38. However, it is appreciated that, in other examples, this may not be the case, in which case the message originated from node 38 is propagated from device to device until a node with the sought-for information is reached.

Node 31, having the information but not having a connection to the information repository (e.g., an Internet connection enabling communication to Web site 300), typically does not know where to send the information. That is, node 31 does not know that node 38 is seeking the information; even if node 31 knows that node 38 is to receive the information, node 31 typically cannot direct a message to node 38, as a communication path may not exist between the two nodes. According to the present invention, in one embodiment, node 31 creates a message that includes the sought-for information and also the address originally specified by node 38. In another embodiment of the present invention, node 31 adds the sought-for information to the message that was received from node 33. In any case, according to the various embodiments of the present invention, the information and the address are propagated by node 31 to other nodes (e.g., nodes 32 and 34) in the manner described above.

Node 32 receives the message from node 31 (either by reading the message residing on node 31, or by receiving a broadcast of the message from node 31). Node 32 has the capability to connect with the information repository and, using a known method, sends the information to the address specified in the message (e.g., to Web site 300 via an Internet connection). The originator of the message (e.g., a user at node 38) can then retrieve the information by accessing the information repository. In one embodiment, the user can access Web site 300 using any device with Internet access.

Thus, according to one embodiment of the present invention, an ad hoc network of wireless devices can be actively searched for a specific item of information. Once the information is obtained, it can be stored on a central repository for easy access and fast reference. The node at which the request for information originated does not need to know either where the information is stored or the topology of the network, and the node providing the information does not need to know which node initiated the search. Nor must there be a direct path between the node that originated the search and the node that responds with the sought-after information.

Figure 4:
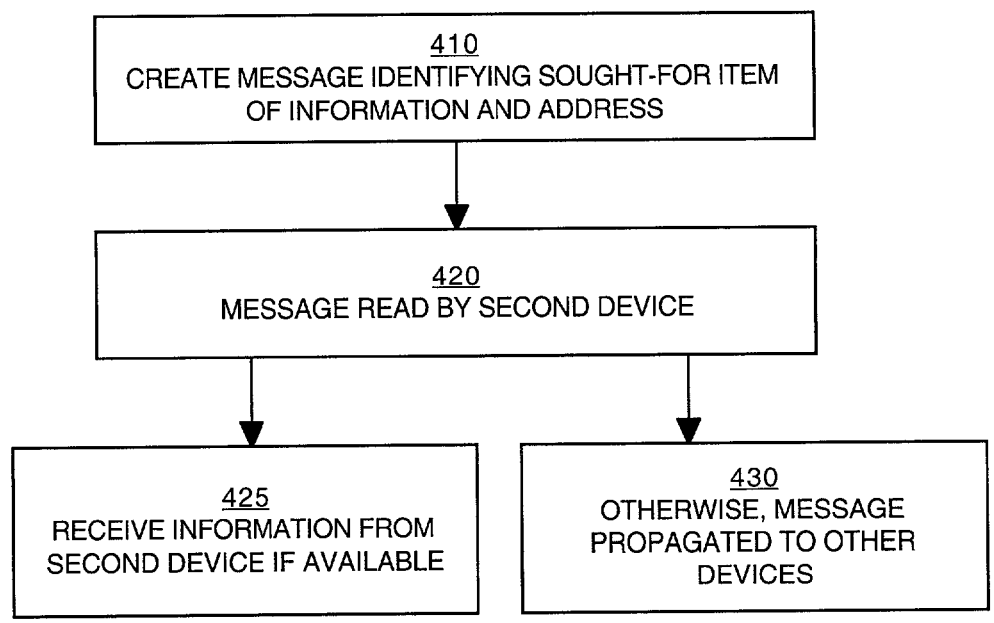
FIG. 4 is a flowchart showing a method in which a message is created and propagated through an ad hoc network in accordance with one embodiment of the present invention.
Figure 5:
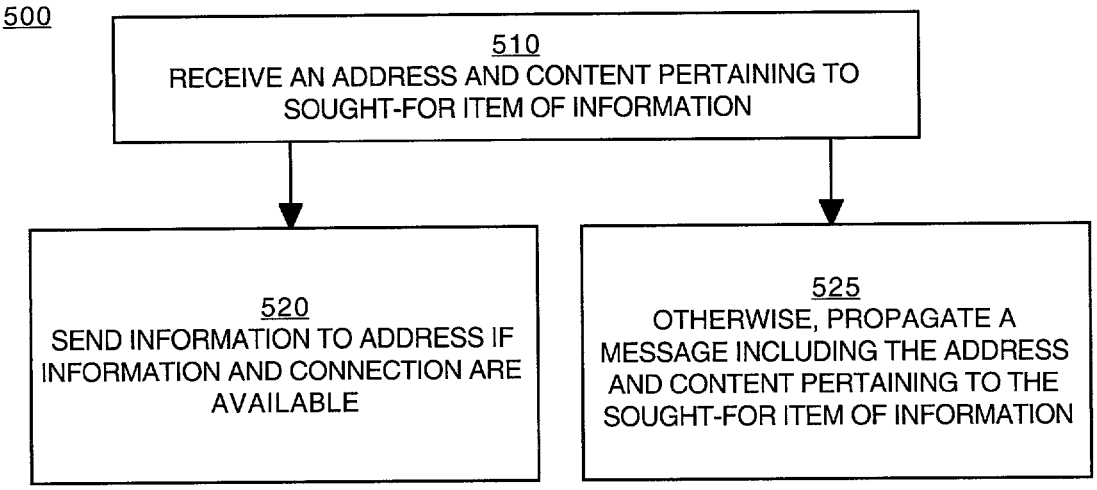
FIG. 5 is a flowchart showing a method in which nodes respond to a message being propagated through an ad hoc network in accordance with one embodiment of the present invention.

FIG. 4 is a flowchart 400 showing a method in which a message is created and propagated through an ad hoc network in accordance with one embodiment of the present invention. FIG. 5 is a flowchart 500 showing a method in which nodes respond to a message being propagated through an ad hoc network in accordance with one embodiment of the present invention. Flowcharts 400 and 500 include processes of the present invention which, in one embodiment, are carried out by a processor (e.g., processor 250 of FIG. 2) under the control of computer-readable and computer-executable instructions. The computer-readable and computer-executable instructions reside, for example, in data storage features such as computer readable volatile memory 210, computer readable non-volatile memory 230, and/or data storage device 290 of FIG. 2.

Although specific steps are disclosed in flowcharts 400 and 500 of FIGS. 4 and 5, respectively, such steps are exemplary. That is, embodiments of the present invention are well suited to performing various other steps or variations of the steps recited in flowcharts 400 and 500. It is appreciated that the steps in flowcharts 400 and 500 may be performed in an order different than presented, and that not all of the steps in flowcharts 400 and 500 may be performed.

With reference first to FIG. 4, the exemplary steps in flowchart 400 are described. In one embodiment, the present invention allows an ad hoc network of nodes (e.g., wireless devices) to be searched for a particular item of information, and for that item of information to be accessible once it is located. In this embodiment, the process of flowchart 400 is implemented by the node that initiates the search.

In step 410, in the present embodiment, a message is created that identifies the sought-for item of information. The message resides in storage on one of the nodes in the network. The manner of identifying the item of information being sought may take many different forms that are familiar to those in the art. For example, the item of information may be identified using a keyword or keywords. The item of information may be identified in the form of a query that can be parsed into an XML message, for example. It is also contemplated that specific software applications directed toward facilitating a search and retrieval process according to embodiments of the present invention can be loaded onto the various nodes. In fact, these software applications can be carried along with the message as the message is propagated from node to node, in order to facilitate the handling of the information in the message.

According to the present embodiment of the present invention, the message created in step 410 also includes an address for a central information repository. In one embodiment, the address is a Web-based address such as a Uniform Resource Locator (URL). As explained above, the address is used as the destination for the item of information once the item of information is located. In one embodiment, the message includes a unique message ID.

In step 420, in the present embodiment, the information in the message is propagated to a second node (device). As described above, in various embodiments, the second device reads the message as the message resides on the node that originated the message, or the message is broadcast to the second device. Note that, in either case, the user of the second device can assert control over whether or not to access or receive the message. The type of techniques that can be used to control or limit participation in a search and retrieval process in accordance with the various embodiments of the present invention are known in the art.

In step 425, in the present embodiment, if the sought-for information resides on the second device, then it is received at the originating node from the second device. Otherwise, in step 430, the message is propagated to other nodes in the network. Propagation of the message will occur as the originating node comes into communication with other nodes, allowing these nodes to either read the message or to receive the message in a broadcast transmission. These nodes, including the second device referred to above, also will propagate the message, as described further in conjunction with the embodiment illustrated by FIG. 5. In this manner, the message can be readily propagated through the nodes. As nodes join in an ad hoc network, the message will be distributed to them. In addition, as nodes leave an ad hoc network, they will likely join or form other ad hoc networks with other nodes, further propagating the message by carrying the message to other nodes. Thus, in one embodiment, the mobility of the nodes can enhance the search process, as the message is spread from node to node.

Referring now to FIG. 5, the exemplary steps in flowchart 500 are described. In the present embodiment, the process of flowchart 500 is implemented by a node once a search and retrieval process according to embodiments of the present invention has been initiated (as described in conjunction with FIG. 4). Although described for a single node, and a single search, it is understood that the steps of flowchart 500 can actually be implemented by a number of nodes, conducting multiple searches, in parallel.

In step 510 of FIG. 5, in the present embodiment, a node receives an address and content that is associated with the sought-for item of information. This information may be read from a message residing on another node, or another node may send (e.g., broadcast) this information.

The content received by the node may include information identifying the item of information being sought, as described above. The content may instead include the item of information being sought. In the latter case, one of the upstream nodes has located the sought-for information but did not have an Internet connection, and so the sought-for information is propagated until it can be sent to the specified address. In the former case, none of the "upstream" nodes have located the sought-for information, and so the information identifying the sought-for information continues to be propagated. In response, the node can initiate a search of its memories to determine if the sought-for information can be located therein.

In step 520, in the present embodiment, if the node has the capability to connect with the information repository identified by the address, and if the sought-for information is available, then the information is sent to the address. The information may be available because it was received by the node in step 510. Alternatively, the information may be available because it was located on the node. That is, as described above, the node may have received information identifying the sought-for information, conducted a search, and located the information being sought. It is appreciated that the node may receive the sought-for information from another node, and then add information to it or in some other way modify the information. For example, the sought-for information may be in the form of a poll or survey; as the message is propagated from node to node, responses to the survey are added at each node.

Thus, in general, the sought-for information can accumulate over time and represent the input received from several nodes. When a message comprising the sought-for information is finding its way to the information repository, it may pass through nodes that can provide additional information. These nodes can append their information to the message and propagate the message further.

If the sought-for information is not available to the node, or if the node does not have the capability to connect with the information repository, then flowchart 500 proceeds to step 525. In step 525, the address and content pertaining to the sought-for information is propagated to other nodes. Here, the content may be the information identifying the information being sought. Otherwise, the content may be the sought-for information if that information is available to the node (that is, either the sought-for information was received by the node from an upstream node, or it was received and modified by the node with additional information available on the node, or it was located on the node).

In accordance with embodiments of the present invention, the process of flowchart 500 can progress until the sought-for information is located and sent to the information repository identified by the address (e.g., to a Web site identified by a Web-based address). However, in various embodiments, mechanisms can be put into place to limit the propagation of messages. For example, the message that originated a search and retrieval process according to embodiments of the present invention can include a stamp that specifies an expiration date for the search. The search could instead be terminated after the message has made a specified number of hops between nodes without the sought-for information being found. Also, the message could include positional information indicating the position of the node that originated the search; any node that receives the message but is a specified distance away from the originating node may choose to disregard the message. In addition, using the unique message ID of the originating message, the information repository can initiate a return message indicating that the sought-for information has been received; this return message can propagate in the same manner as the search message, and would serve to terminate searches associated with the unique message ID.

In summary, embodiments of the present invention provide a method that allows information residing in wireless devices to be searched for and retrieved. The present invention also provides a method that accomplishes this within the framework of an ad hoc network of devices. In fact, in one embodiment, the present invention advantageously uses the mobility of devices to facilitate the search and retrieval process.

The preferred embodiment of the present invention, a method for searching nodes for information, is thus described. While the present invention has been described in particular embodiments, it should be appreciated that the present invention should not be construed as limited by such embodiments, but rather construed according to the following claims.

What is claimed is:

1. In a wireless device, a method of searching for an item of information residing on another wireless device, said method comprising:

creating a message that identifies said item of information and that also identifies an address, said message readable by a second wireless device within communication range wherein said message is read by said second device, said second device creating a second message that is a duplicate of said message; and receiving said item of information from said second wireless device provided said item of information is available therefrom and said second wireless device remains in communication with said wireless device, wherein otherwise said message is propagated by said second wireless device to other wireless devices, wherein in response to said message any of said other wireless devices having said item of information and a connection to said address sends said item of information to said address.

2. The method as recited in claim 1 wherein said address is a Web-based address.

3. The method as recited in claim 1 comprising:
sending said message to said second wireless device.

4. The method as recited in claim 1 wherein said second wireless device and said other wireless devices comprise sensor devices in a sensor network.

5. The method as recited in claim 1 wherein said message comprises Extensible Markup Language (XML) code.

6. The method as recited in claim 1 wherein said message comprises a unique message identifier.

7. In a wireless device, a method of retrieving an information item sought by another wireless device, said method comprising:

receiving from a second wireless device an address and content associated with said information item; and propagating a message to other wireless devices within communication range by reading and duplicating said message, said message comprising said address and said content, wherein in response to said message any of said other wireless devices having said item of information and a connection to said address sends said item of information to said address.

8. The method as recited in claim 7 wherein said content associated with said information item identifies said sought-for information item.

9. The method as recited in claim 7 wherein said content associated with said information item comprises said information item.

10. The method as recited in claim 7 wherein said address is a Web-based address.

11. The method as recited in claim 7 comprising:

receiving a message from said second device, said message from said second device comprising said address and said content associated with said information item.

12. The method as recited in claim 7 wherein said other wireless devices comprise sensor devices in a sensor network.

13. The method as recited in claim 7 wherein said message comprises Extensible Markup Language (XML) code.

14. In a wireless device, a method of providing an information item sought by another wireless device, said method comprising:

receiving from a second wireless device an address and content associated with said information item; and sending said information item to said address provided a connection to said address is available and said information item is available and otherwise propagating a message to other wireless devices within communication range by reading and duplicating said message, said message comprising said address, said message also comprising said information item provided said information item is available and otherwise said message identifying a sought-for information item, wherein in response to said message any of said other wireless devices having said information item and a connection to said address sends said information item to said address.

15. The method as recited in claim 14 wherein said content associated with said information item identifies said sought-for information item.

16. The method as recited in claim 14 wherein said content associated with said information item comprises said information item.

17. The method as recited in claim 14 wherein said address is a Web-based address.

18. The method as recited in claim 14 comprising:

receiving a message from said second device, said message from said second device comprising said address and said content associated with said information item.

19. The method as recited in claim 14 wherein said other wireless devices comprise sensor devices in a sensor network.

20. The method as recited in claim 14 wherein said message comprises Extensible Markup Language (XML) code.

* * * * *